(12) United States Patent
Hashimoto et al.

(10) Patent No.: US 12,129,879 B2
(45) Date of Patent: Oct. 29, 2024

(54) SUCTION STRAINER

(71) Applicant: YAMASHIN-FILTER CORP., Kanagawa (JP)

(72) Inventors: Shigeru Hashimoto, Kanagawa (JP); Nobuyuki Kitajima, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 332 days.

(21) Appl. No.: 17/580,855

(22) Filed: Jan. 21, 2022

(65) Prior Publication Data

US 2022/0145912 A1    May 12, 2022

Related U.S. Application Data

(63) Continuation of application No. PCT/JP2020/029141, filed on Jul. 29, 2020.

(30) Foreign Application Priority Data

Aug. 1, 2019   (JP) .................. 2019-141972

(51) Int. Cl.
*F15B 21/04*   (2019.01)
*B01D 24/00*   (2006.01)
(Continued)

(52) U.S. Cl.
CPC ............ *F15B 21/041* (2013.01); *B01D 24/00* (2013.01); *B01D 29/07* (2013.01); *B01D 35/027* (2013.01); *F15B 21/044* (2013.01)

(58) Field of Classification Search
CPC ........ F15B 21/041; F15B 21/044; F15B 1/26; B01D 24/00; B01D 29/07; B01D 35/027; B01D 2201/291; B01D 2201/347; B01D 29/21; B01D 29/333; B01D 35/0276; B01D 36/001
See application file for complete search history.

(56) References Cited

U.S. PATENT DOCUMENTS

2011/0139278 A1   6/2011  Kawajiri et al.
2017/0296947 A1   10/2017  Chikugo et al.
(Continued)

FOREIGN PATENT DOCUMENTS

EP    3311899 A1    4/2018
JP    2000348580 A * 12/2000 ............. A47F 3/125
(Continued)

OTHER PUBLICATIONS

Extended European Search Report issued in European Patent Application No. 20846664.9, dated Jul. 22, 2022 (7 pages).
(Continued)

*Primary Examiner* — Waqaas Ali
(74) *Attorney, Agent, or Firm* — Nakanishi IP Associates, LLC

(57) ABSTRACT

Air bubbles are removable with the use of an air vent structure having a compact and simple configuration. An air vent hole is formed in an upper plate that covers an entire upper end surface of a filtration section having a substantially tubular shape formed by bending a thin plate in a pleat shape. A moving member is provided to be movable between a position of closing the air vent hole and a position of opening the air vent hole.

2 Claims, 16 Drawing Sheets

(51) Int. Cl.
　　　*B01D 29/07*　　　(2006.01)
　　　*B01D 35/027*　　(2006.01)
　　　*F15B 21/041*　　(2019.01)
　　　*F15B 21/044*　　(2019.01)

(56) References Cited

U.S. PATENT DOCUMENTS

2018/0104628 A1* 4/2018 Taku .................... B01D 19/00
2020/0038785 A1　 2/2020 Ishizuka

FOREIGN PATENT DOCUMENTS

| | | |
|---|---|---|
| JP | 2017-6830 A | 1/2017 |
| JP | 6412947 B2 | 10/2018 |
| JP | 2020-22924 A | 2/2020 |
| WO | 2016/051525 A1 | 4/2016 |
| WO | WO-2018199102 A1 * 11/2018 | ............. B01D 19/00 |

OTHER PUBLICATIONS

Extended European Search Report issued in European Patent Application No. 23153637.6, dated Mar. 16, 2023 (7 pages).
International Search Report issued in PCT/JP2020/029141 mailed on Oct. 6, 2020 with English Translation (5 pages).
Office Action (Communication pursuant to Article 94(3) EPC) dated Jul. 26, 2024 issued in European Patent Application No. 23153637.6 (5 pages).

* cited by examiner

SUCTION STRAINER

CROSS-REFERENCE TO RELATED APPLICATIONS

This application is a continuation application of International Patent Application No. PCT/JP2020/029141 filed on Jul. 29, 2020, which claims priority to Japanese Patent Application No. 2019-141972 filed on Aug. 1, 2019, the entire contents of which are incorporated by reference.

TECHNICAL FIELD

The present invention relates to a suction strainer.

BACKGROUND ART

Patent Document 1 discloses a strainer device that includes a check valve on a first lid member of a strainer. The check valve includes a valve main body and a valve body. The valve main body has one end opening to an internal space of a strainer element and the other end provided with a valve passage opening to an inside of a hydraulic oil tank. The valve body is disposed to be movable in a vertical direction with respect to a valve seat provided on the valve passage and abuts on the valve seat by its own weight to bring the valve passage into a closed state.

CITATION LIST

Patent Literature

Patent Document 1: JP 6412947 B

However, in the invention described in Patent Document 1, the valve main body including the valve passage needs to be provided on the first lid member, and this causes a problem in that the check valve increases in size.

SUMMARY OF INVENTION

One or more embodiments of the present invention are directed to a suction strainer that allows removing air bubbles using an air vent structure having a compact and simple structure.

A suction strainer according to one or more embodiments of the present invention is, for example, a suction strainer provided inside a tank in which oil is stored. The suction strainer includes a tubular filtration section, an upper plate, and a moving member. The tubular filtration section is formed by bending a thin plate in a pleat shape (e.g., the filtration section is a tubular (hollow) filter made of a thin plate bended into a pleat shape). The upper plate covers an entire upper end surface of the filtration section. The upper plate has an air vent hole. The moving member is provided to be movable between a position of closing the air vent hole and a position of opening the air vent hole.

According to the suction strainer according to one or more embodiments of the present invention, the air vent hole is formed in the upper plate that covers the entire upper end surface of the filtration section having the tubular shape formed by bending the thin plate in the pleat shape. The moving member is provided to be movable between the position of closing the air vent hole and the position of opening the air vent hole. Thus, air bubbles are removable with the use of an air vent structure having a compact and simple configuration.

Here, the upper plate may include a rod-shaped member provided with a stopper on an upper end portion. The air vent hole may be provided around the rod-shaped member in plan view. The moving member may be a plate-shaped member having a hole into which the rod-shaped member is inserted. The moving member may be movable between a lower end position where the moving member is adjacent to the upper plate to close the air vent hole and an upper end position where the moving member abuts on the stopper. As a result, the moving member can be downsized, and an air vent portion can have a simple configuration.

Here, a first projection and a second projection having circular ring shapes in plan view may be formed on a lower surface of the moving member. The first projection may be formed in a vicinity of an inner peripheral surface of the moving member. The second projection may be formed in a vicinity of an outer peripheral surface of the moving member. This allows closing the air vent hole with the moving member while close contact between the moving member and the plate is prevented.

Here, A hinge may be provided on a first surface orthogonal (substantially orthogonal) to an axis of the filtration section of the upper plate. The air vent hole may be provided on the first surface. The hinge may be provided adjacent to the air vent hole. The hinge may have a rotation shaft parallel (substantially parallel) to the first surface. The moving member may have an end portion provided on the rotation shaft. The moving member may be movable between the position of closing the air vent hole and the position of opening the air vent hole. This allows avoiding the air vent portion to protrude to an upper side of the upper plate when the moving member is at the position of closing the air vent hole.

Here, the moving member may include a plate-shaped portion having a plate shape and a spherical portion having a hemispherical shape that is disposed on the plate-shaped portion and protrudes downward from the plate-shaped portion. The spherical portion may have a radius greater than a radius of the air vent hole. The spherical portion may have a distal end inserted into the air vent hole to close the air vent hole with the moving member. This allows closing the air vent hole with the moving member while close contact between the moving member and the plate is prevented.

Here, the moving member may include a first stopper provided at an upper end portion, a second stopper provided at a lower end portion, and a rod-shaped member that connects the first stopper and the second stopper. The first stopper and the second stopper may have diameters greater than a diameter of the air vent hole in plan view. The rod-shaped member may have a diameter smaller than the diameter of the air vent hole in plan view. In this way, the air vent portion is constituted only by the moving member, thus ensuring configuring the air vent structure having the compact and simple configuration.

Here, the second stopper and the rod-shaped member may have a slit along a longitudinal direction. As a result, the moving member can be easily provided on the upper plate.

Here, the first stopper may have a hemispherical shape or a truncated cone shape. The first stopper and the air vent hole may be in contact by a line (e.g., the contact part between the first stopper and the air vent hole forms a line shape). This allows closing the air vent hole with the moving member while close contact between the moving member and the plate is prevented.

According to one or more embodiments of the present invention, the air bubbles can be removed using the air vent structure having the compact and simple structure.

DESCRIPTION OF EMBODIMENTS

Hereinafter, embodiments of the present invention will be described in detail with reference to the drawings.

First Embodiment

Figure 1:
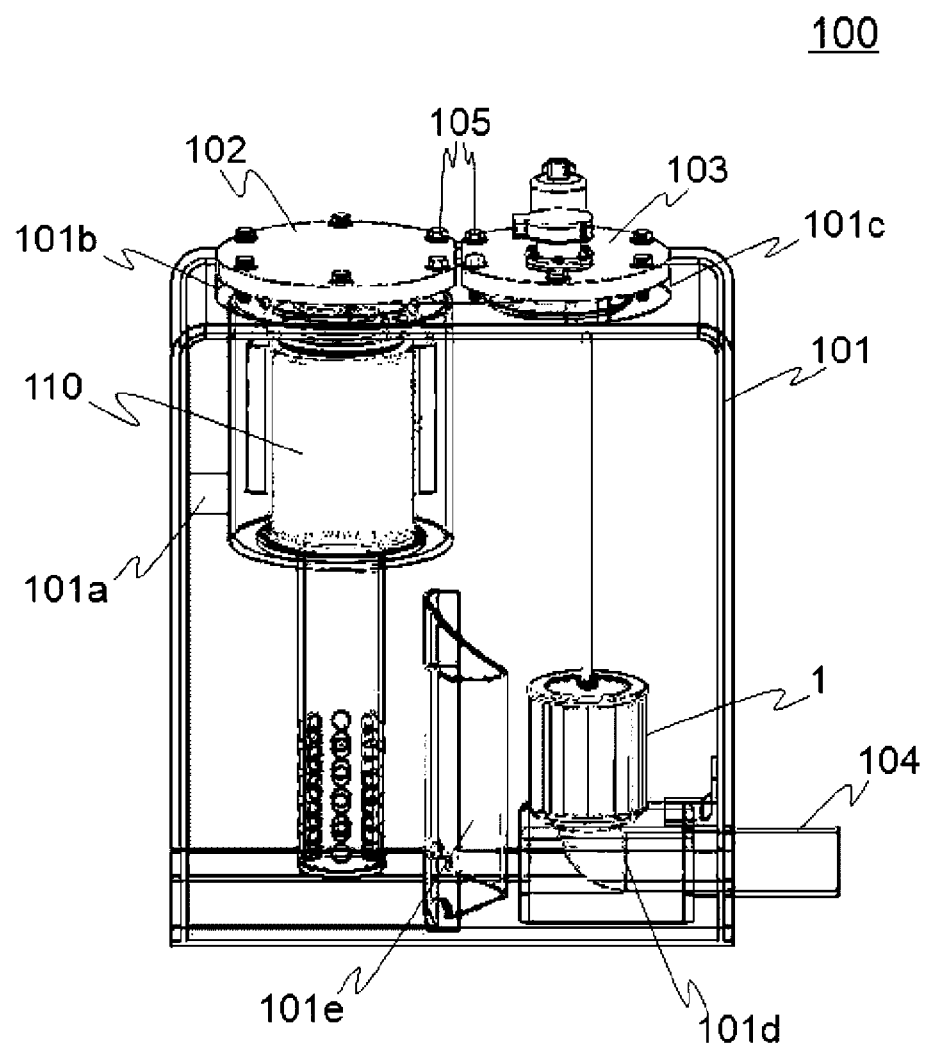
FIG. 1 is a diagram illustrating an outline of a hydraulic oil tank 100 provided therein with a suction strainer 1 according to an embodiment of the present invention.

FIG. 1 is a diagram illustrating an outline of a hydraulic oil tank 100 provided therein with a suction strainer 1 according to an embodiment of the present invention. In FIG. 1, main parts of the hydraulic oil tank 100 are illustrated from a perspective view.

The hydraulic oil tank 100 is installed in a work machine that is not illustrated (e.g., a hydraulic device), and is a tank provided inside a hydraulic circuit of a hydraulic oil to be supplied to the hydraulic device to store the hydraulic oil. In the hydraulic circuit, the hydraulic oil passes through the hydraulic device to be introduced into the hydraulic oil tank 100. The hydraulic oil tank 100 includes a tank body 101 having a box shape, for example, and this tank body 101 has a hollow inside. The tank body 101 primarily includes the suction strainer 1 and a return filter 110.

An inflow port 101a configured to allow the hydraulic oil to flow into the tank body 101 is formed on a side surface of the tank body 101. The hydraulic oil that has entered through the inflow port 101a is introduced into the return filter 110. The hydraulic oil is filtered by the return filter 110 and is stored in the hydraulic oil tank 100.

Further, openings 101b, 101c used for maintenance of the suction strainer 1, the return filter 110, and the like are formed at an upper end portion of the tank body 101. A lid body 102 is attached to the opening 101b, and a lid body 103 is attached to the opening 101c.

Bolt insertion holes are formed in peripheral edge portions of the lid bodies 102, 103. Bolts 105 inserted through the bolt insertion holes are screwed into bolt holes (not illustrated) of the tank body 101, thereby tightening the lid bodies 102, 103 to the tank body 101.

An outflow port 101d that allows the hydraulic oil inside the tank body 101 to flow out to a hydraulic pump (not illustrated) is formed in a vicinity of a lower end portion of the tank body 101 (on a side surface of the tank body 101 near a bottom surface in the present embodiment). A suction pipe 104 that leads to a suction port of the hydraulic pump (not illustrated) is fitted into the outflow port 101d from an outer side of the tank body 101.

To prevent foreign matter from entering the suction pipe 104, the suction strainer 1 is provided on an upper side of the outflow port 101d (inner side of the tank body 101). The hydraulic oil stored in the hydraulic oil tank 100 is suctioned into the hydraulic pump (not illustrated), flows out to the suction pipe 104 via the suction strainer 1, and is supplied once again to the hydraulic apparatus.

Note that the outflow port 101d is not limited to the position illustrated in FIG. 1 as long as the position is in the vicinity of the lower end portion of the tank body 101. For example, the outflow port 101d may be formed on a bottom surface of the tank body 101.

A partition plate 101e that partitions a space into a space where the suction strainer 1 is provided and a space where the return filter 110 is provided is provided to the bottom surface of the tank body 101. Note that the partition plate 101e is not necessarily required.

Figure 2:
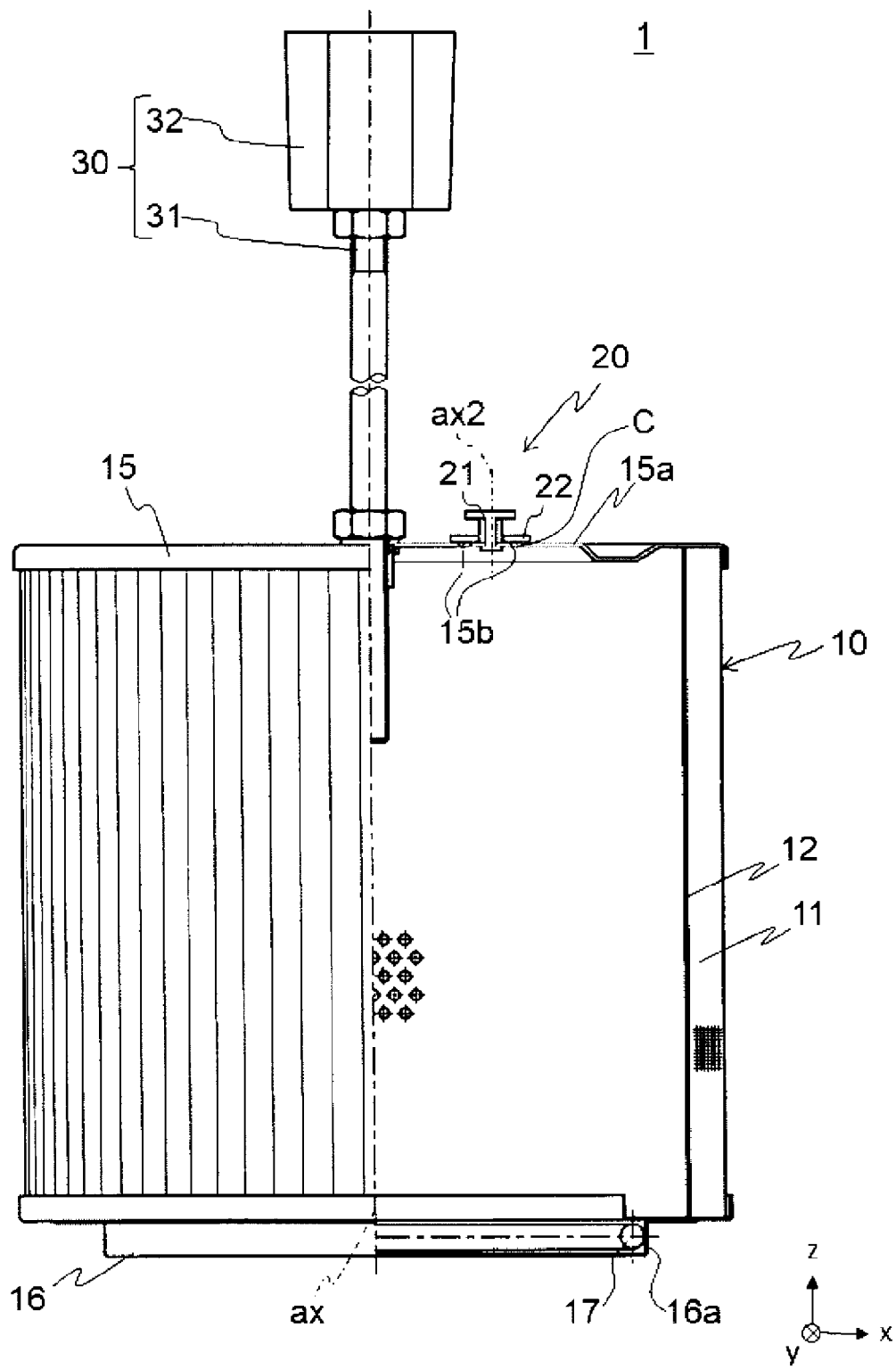
FIG. 2 is a diagram illustrating an outline of the suction strainer 1.

FIG. 2 is a diagram illustrating an outline of the suction strainer 1 (note that hatching indicating a cross section is omitted). The suction strainer 1 primarily includes a strainer portion 10, an air vent portion 20, and a rod portion 30 connected to the strainer portion 10.

The strainer portion 10 is a member having a substantially cylindrical shape, and is placed on the upper side of the outflow port 101d (see FIG. 1).

As illustrated in FIG. 2, the strainer portion 10 primarily includes a filtration section 11, an inner tube 12, and plates 15, 16.

The inner tube 12 is a member having a substantially hollow cylindrical shape having openings in both ends, and is formed by using a material having high corrosion resistance (for example, stainless steel or resin). The inner tube 12 has holes through which a hydraulic oil passes in a substantially its entire region.

The filtration section 11 is provided on an outer side of the inner tube 12. The filtration section 11 has a substantially cylindrical shape and a thickness in a radial direction. A height of the filtration section 11 is substantially the same as a height of the inner tube 12. The filtration section 11 is formed by bending a sheet-shaped thin plate having holes formed in substantially the entire region thereof in a pleat shape, connecting both ends of the bent thin plate, and rounding it in a cylindrical shape. Note that while the filtration section 11 is formed of a wire mesh made of a fine metal (stainless steel, for example) and formed of thin wires woven into a mesh in the present embodiment, a filter paper made of, for example, a synthetic resin and paper may be used. The filtration section 11 is configured to filter the hydraulic oil.

The plate 15 is provided on one end of the filtration section 11 and the inner tube 12, and the plate 16 is provided on the other end. The plate 15 and the plate 16 are members having a substantially circular plate shape or a bottomed substantially cylindrical shape, and are formed of resin or metal.

The plate 15 and the plate 16 are provided so as to cover the ends (openings) of the filtration section 11 and the inner tube 12. In other words, the filtration section 11 and the inner tube 12 are sandwiched between the plate 15 and the plate 16.

The plate 15 has a surface 15a that covers the entire upper end surfaces of the filtration section 11 and the inner tube 12 and is substantially orthogonal to an axis ax of the filtration section 11. Air vent holes 15b are formed in the surface 15a. A plurality of the air vent holes 15b are provided around a rod-shaped member 21 (described in detail later) in plan view (as viewed in the z-direction). In the present embodiment, the plurality of air vent holes 15b are provided along a circle C centering a center axis ax2 of the rod-shaped member 21 in plan view. A diameter of this circle C is larger than a diameter of the rod-shaped member 21.

The plate 15 is provided with the rod-shaped member 21 (described in detail below). The rod-shaped member 21 and the moving member 22 are the air vent portion 20. The air vent portion 20 will be described in detail later.

A fitting portion 16a having a cylindrical shape that covers the entire lower end surfaces of the filtration section 11 and the inner tube 12 and is externally fitted to the outflow port 101d is formed on the plate 16. A sealing member 17 provided to an inner peripheral surface of the fitting portion 16a prevents the hydraulic oil from entering the inside of the strainer portion 10 from between the plate 16 and the outflow port 101d.

The rod portion 30 primarily includes a rod 31 and a mounting portion 32. The rod 31 is disposed in a posture extending upward from the strainer portion 10. The mounting portion 32 mounted to a mounting portion (not illustrated) formed on a back surface of the lid body 103 is provided to an upper end portion of the rod 31.

A spring (not illustrated) is provided in the mounting portion 32 with its entire length compressed. With the suction strainer 1 provided in the tank body 101, the spring biases the rod 31, that is, the strainer portion 10 downward (in the −z direction).

The suction strainer 1 can be pulled out from the tank body 101 during, for example, maintenance by removing the lid body 103 from the tank body 101 and pulling the upper end portion of the rod 31.

Figure 3:
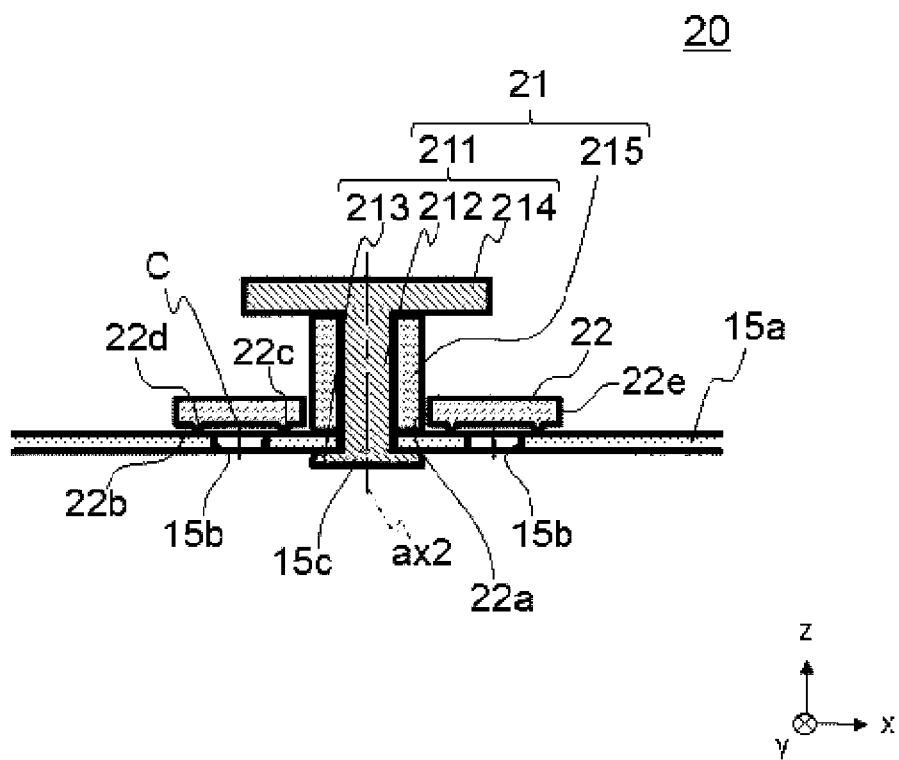
FIG. 3 is a cross-sectional view illustrating an outline of an air vent portion 20.
Figure 4:
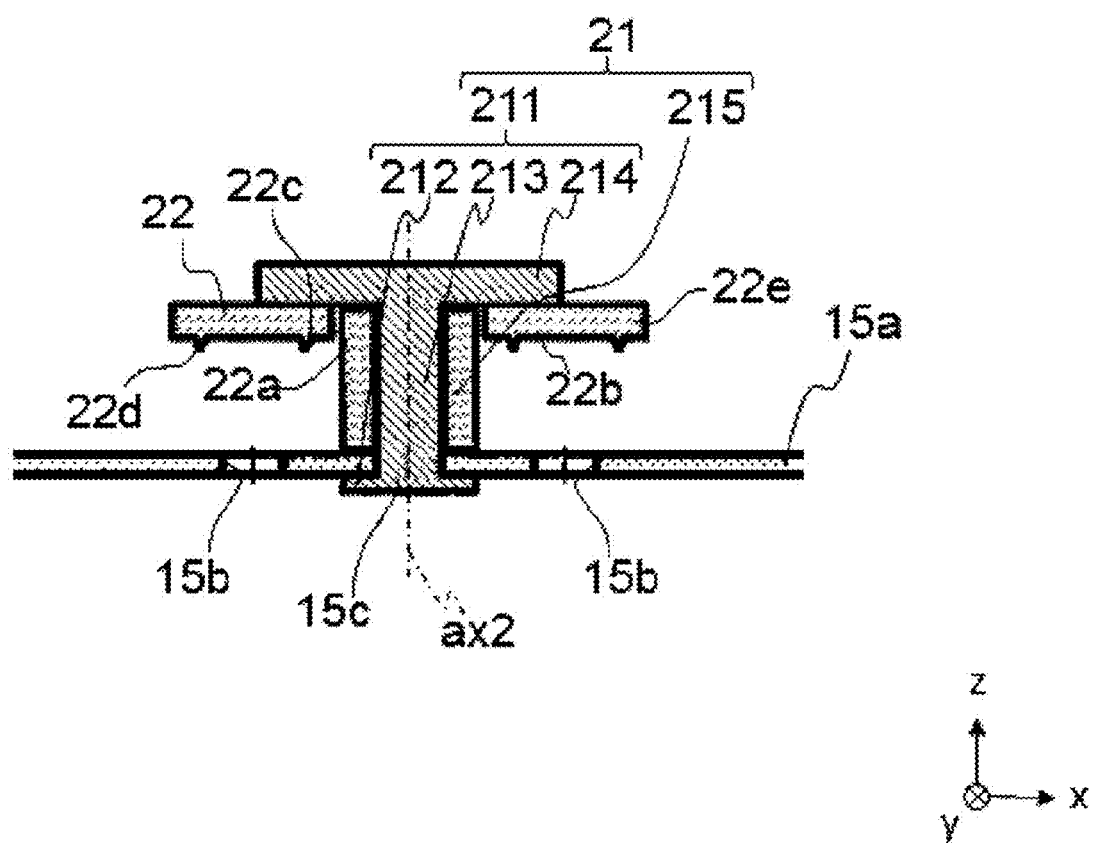
FIG. 4 is a cross-sectional view illustrating an outline of the air vent portion 20.

Next, the air vent portion 20 will be described. FIG. 3 and FIG. 4 are cross-sectional views illustrating an outline of the air vent portion 20. FIG. 3 illustrates a case in which the moving member 22 is located at the lower end position, and FIG. 4 illustrates a case in which the moving member 22 is located at the upper end position. The air vent portion 20 primarily includes the rod-shaped member 21 and the moving member 22.

The rod-shaped member 21 is a member fixed to the surface 15a of the plate 15, and primarily includes a body portion 211 made of metal and a guide portion 215 made of resin. A rod-shaped portion 212 passes through a hole 15c formed in the surface 15a and a stopper 213 provided at the lower end portion of the rod-shaped portion 212 is fixed to the back surface of the surface 15a by, for example, welding, thus providing the body portion 211 in the plate 15.

The guide portion 215 is provided around the rod-shaped portion 212. The moving member 22 moves along the outer peripheral surface of the guide portion 215.

A stopper 214 that stops the movement of the moving member 22 is provided on the upper end portion of the rod-shaped portion 212. A diameter of the stopper 214 is larger than diameters of the body portion 211 and the guide portion 215.

The moving member 22 is a plate-shaped member having a hole 22a into which the rod-shaped portion 212 is inserted. The moving member 22 is formed using a material (may be metal or resin) having a density greater than or substantially equal to a density of the hydraulic oil. An inner diameter of the moving member 22 is smaller than a diameter of the circle C, and an outer diameter of the moving member 22 is larger than the diameter of the circle C. The moving member 22 is provided between the surface 15a and the stopper 214, and is movable in the vertical direction (the z-direction) between a position where the air vent holes 15b are closed and a position where the air vent holes 15b are opened.

Projections 22c, 22d are provided on a surface 22b on the lower side of the moving member 22. The projections 22c, 22d have substantially circular ring shapes in plan view, and prevent close contact of the surface 22b with the surface 15a.

The projection 22c is formed in the vicinity of the inner peripheral surface (i.e., the hole 22a) of the moving member 22, and the projection 22d is formed in the vicinity of an outer peripheral surface 22e of the moving member 22. Additionally, in the cross-sectional view as illustrated in FIG. 3, the air vent holes 15b are positioned between the projection 22c and the projection 22d. Accordingly, abutment of the projections 22c, 22d with the surface 15a covers the air vent holes 15b with the moving member 22.

As illustrated in FIG. 3, when the moving member 22 is positioned at the lower end, the moving member 22 closes the air vent holes 15b. In contrast, at the upper end position where the moving member 22 moves in the upward direction (the +z direction) and abuts on the stopper 214, the air vent holes 15b open.

Next, the functionality of the suction strainer 1 thus configured will be described. First, the suction strainer 1 is attached to the tank body 101 storing the hydraulic oil. With the rod 31 held so that the mounting portion 32 is positioned upward (in the +z direction), the suction strainer 1 is pushed downward (in the −z direction).

The upper end of the strainer portion 10 is covered with the plate 15. Thus, in a case where the suction strainer 1 is mounted to the inside of the tank body 101, air accumulates on the inner side of the inner tube 12, that is, the lower side of the plate 15. The air accumulating on the lower side of the plate 15 pushes up the moving member 22 in the +z direction via the air vent holes 15b. As a result, the air vent holes 15b are opened, and the air accumulated on the lower side of the plate 15 is released outside the tank body 101 from the inside of the strainer portion 10. As a result, the suction strainer 1 is set in the tank body 101, enabling the functionality of the suction strainer 1.

In a case where the hydraulic oil stored in the tank body 101 is suctioned into the hydraulic pump (not illustrated), the hydraulic oil is drawn from the outer side of the filtration section 11 into the strainer portion 10 of the suction strainer 1. The filtration section 11 removes, for example, dust from the hydraulic oil, and the hydraulic oil flows out to the inside of the inner tube 12. The oil that has flowed into the inner tube 12 flows outside the strainer portion 10 from below.

In a case where the hydraulic oil is drawn from the outer side of the filtration section 11 into the strainer portion 10, the air bubbles contained in the hydraulic oil are drawn into the strainer portion 10 along with the hydraulic oil. As the air bubbles sucked into the strainer portion 10 grow large and move up and some amount of air accumulates on the lower side of the plate 15, the air accumulated on the lower side of the plate 15 pushes up the moving member 22 in the +z direction via the air vent holes 15b, the air vent holes 15b are opened, and the air accumulated on the lower side of the plate 15 is released from the inside of the strainer portion 10 to outside the tank body 101.

Note that, while the hydraulic oil is filtered and the air bubbles are removed by the suction strainer 1, a downward force is biased to the moving member 22 by the suctioning force of the hydraulic pump (not illustrated). A gravity of the moving member 22 and the downward force that acts on the moving member 22 cause the moving member 22 to cover the air vent holes 15b, and thus the hydraulic oil from which the air bubbles have not been removed no longer flows into the inner tube 12.

According to the present embodiment, the air accumulated inside the strainer portion 10, that is, on the lower side of the plate 15 can be released from the inside of the strainer portion 10 to the tank body 101. In addition, the moving member 22 can be downsized, and the air vent portion 20 having the simple configuration in which the plate-shaped moving member 22 is moved along the rod-shaped member 21 can be formed.

Second Embodiment

While the moving member 22 is moved in the vertical direction to open and close the air vent holes 15b in the first embodiment of the present invention, the configuration for opening and closing the air vent holes is not limited thereto.

The second embodiment of the present invention is a configuration for opening and closing an air vent hole by rotating a plate-shaped moving member. Below, description is given of a suction strainer 2 according to the second embodiment. Note that the same components as those in the first embodiment are denoted by the same reference numerals, and descriptions thereof will be omitted.

Figure 5:
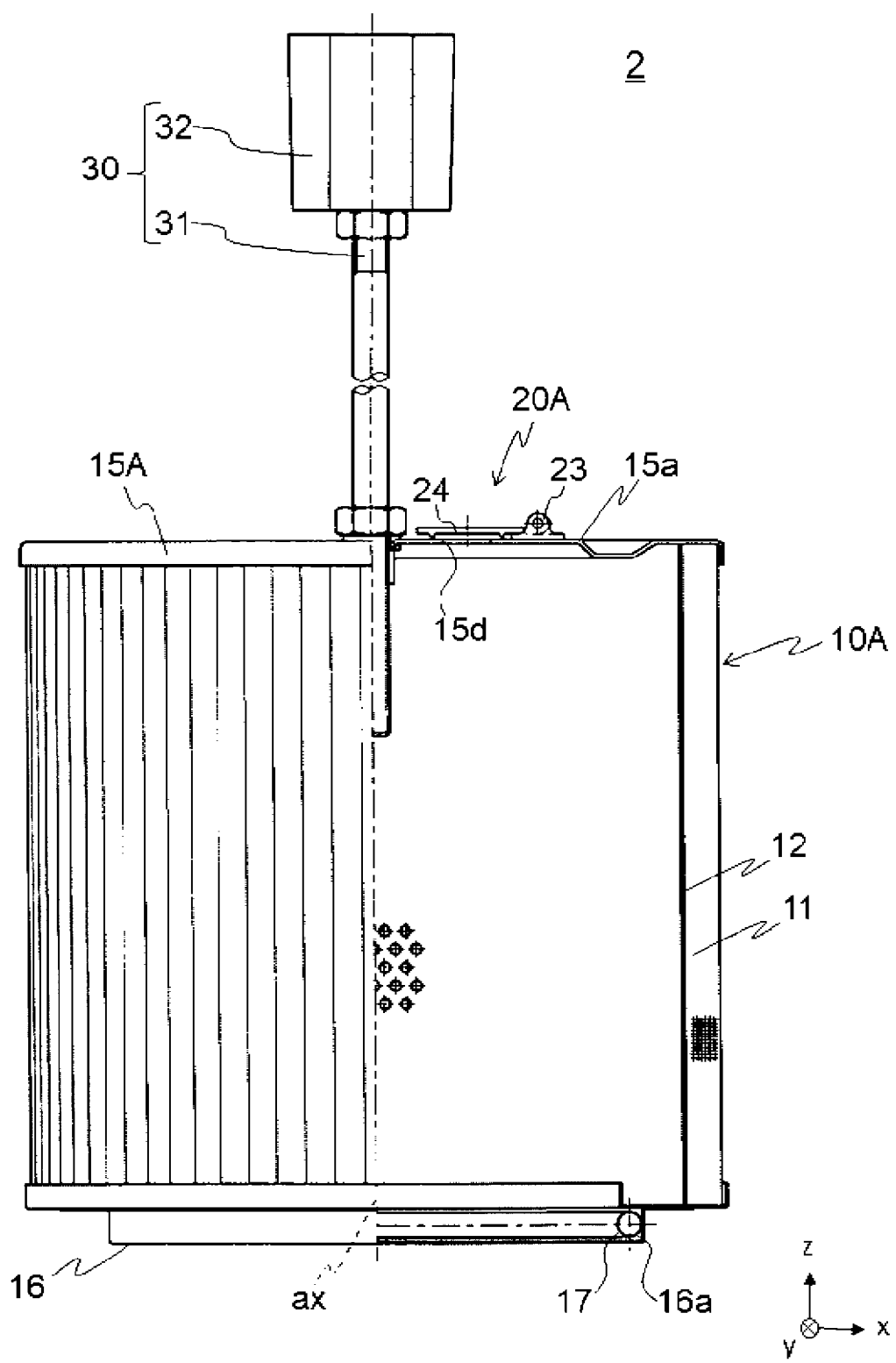
FIG. 5 is a diagram illustrating an outline of a suction strainer 2.

FIG. 5 is a diagram illustrating an outline of a suction strainer 2 (note that hatching indicating a cross section is omitted). The suction strainer 2 primarily includes a strainer portion 10A, an air vent portion 20A, and the rod portion 30 connected to the strainer portion 10A.

The strainer portion 10A primarily includes the filtration section 11, the inner tube 12, and plates 15A, 16A. The air vent portion 20A primarily includes a hinge 23 and a moving member 24. The plate 15A has the surface 15a, and an air vent hole 15d is formed in the surface 15a. The air vent hole 15d is provided in the vicinity of the rod 31 in plan view (as viewed in the z-direction), but the position of the air vent hole 15d is not limited to this.

Figure 6:
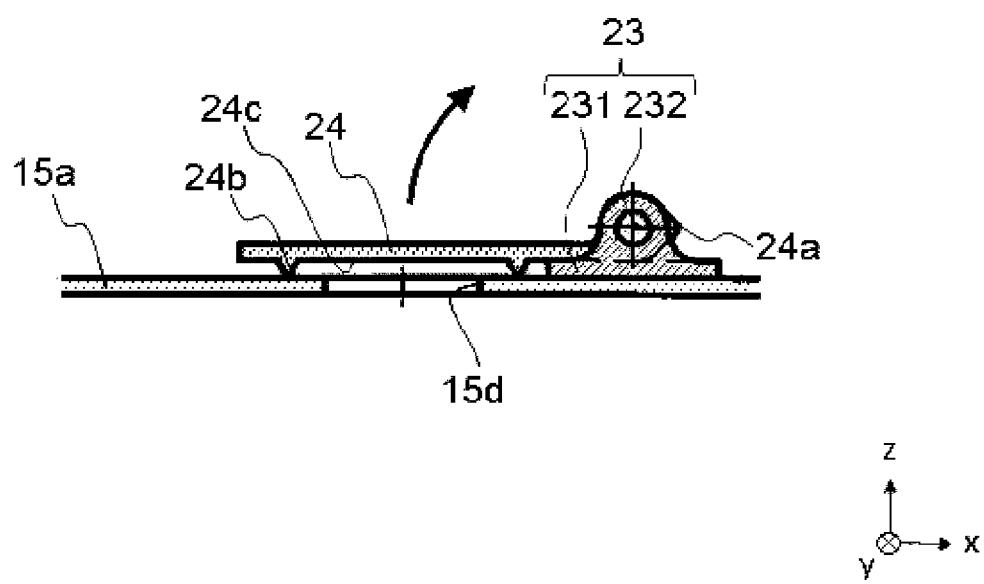
FIG. 6 is a cross-sectional view illustrating an outline of an air vent portion 20A.
Figure 7:
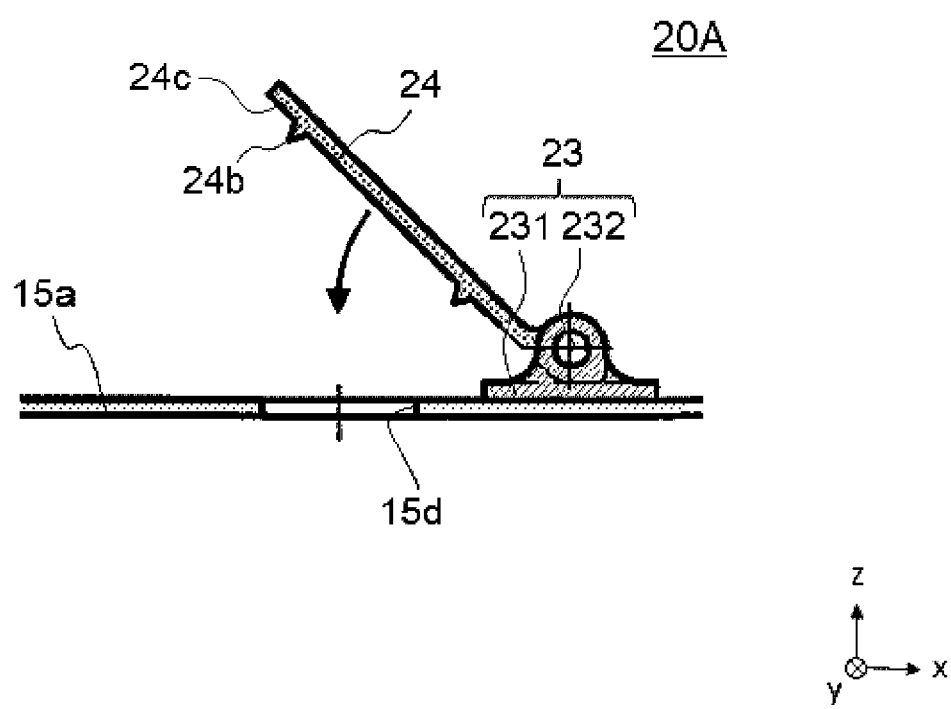
FIG. 7 is a cross-sectional view illustrating an outline of the air vent portion 20A.

FIG. 6 and FIG. 7 are cross-sectional views illustrating an outline of the air vent portion 20A. FIG. 6 illustrates a case in which the moving member 24 is disposed at a position of covering the air vent hole 15d, and FIG. 7 illustrates a case in which the moving member 24 is disposed at a position of opening the air vent hole.

The hinge 23 is provided at a position adjacent to the air vent hole 15d of the surface 15a, and includes a base portion 231 fixed to the surface 15a and a rotation shaft 232 provided on the base portion 231. The rotation shaft 232 is substantially parallel to the surface 15a and substantially along the horizontal direction in a state in which the suction strainer 2 is provided inside the hydraulic oil tank 100.

The moving member 24 is formed using a material (may be metal or resin) having a density greater than or substantially equal to a density of the hydraulic oil. The moving member 24 is a substantially plate-shaped member, and has an end portion 24a provided on the rotation shaft 232. As a result, the moving member 24 is rotatable about the rotation shaft 232. Note that the shape of the moving member 24 in plan view may be a substantially circular shape or may be a substantially rectangular shape.

A projection 24b is provided on a surface 24c on the lower side of the moving member 24. The projection 24b has a circular ring shape in plan view and has a cross-sectional shape of a substantially triangular shape or a substantially semicircular shape. Thus, the projection 24b prevents close contact of the surface 24c with the surface 15a.

Next, the action of the suction strainer 2 will be described. Among the actions of the suction strainer 2, the same portions as the actions of the suction strainer 1 will not be described below.

When the moving member 24 is pushed up by the air accumulated on the lower side of the plate 15 via the air vent hole 15d, the moving member 24 rotates about the rotation shaft 232 (see the arrow in FIG. 6), and moves from the position where the air vent hole 15d is closed as illustrated in FIG. 6 to the position where the air vent hole 15d is opened as illustrated in FIG. 7. As a result, the air vent hole 15d is opened, and the air accumulated on the lower side of the plate 15 is released to the outside of the strainer portion 10.

When the hydraulic oil stored in the tank body 101 is suctioned into the hydraulic pump (not illustrated), the suctioning force by the hydraulic pump (not illustrated) causes the moving member 24 to rotate about the rotation shaft 232 in the direction of closing the air vent hole 15d (see the arrow in FIG. 7), and the moving member 24 covers the air vent hole 15d. As a result, the hydraulic oil from which air bubbles have not been removed no longer flows into the inner tube 12.

According to the present embodiment, the air accumulated inside the strainer portion 10, that is, on the lower side of the plate 15, can be released from the inside of the strainer portion 10 to outside the tank body 101. Further, configuring the plate-shaped moving member 24 so as to rotate about the rotation shaft 232 allows avoiding the air vent portion 20A to protrude to the upper side of the plate 15 when the moving member 24 is at the position of closing the air vent hole 15d. Also, the air vent portion 20A can be a compact and simple configuration.

Figure 8:
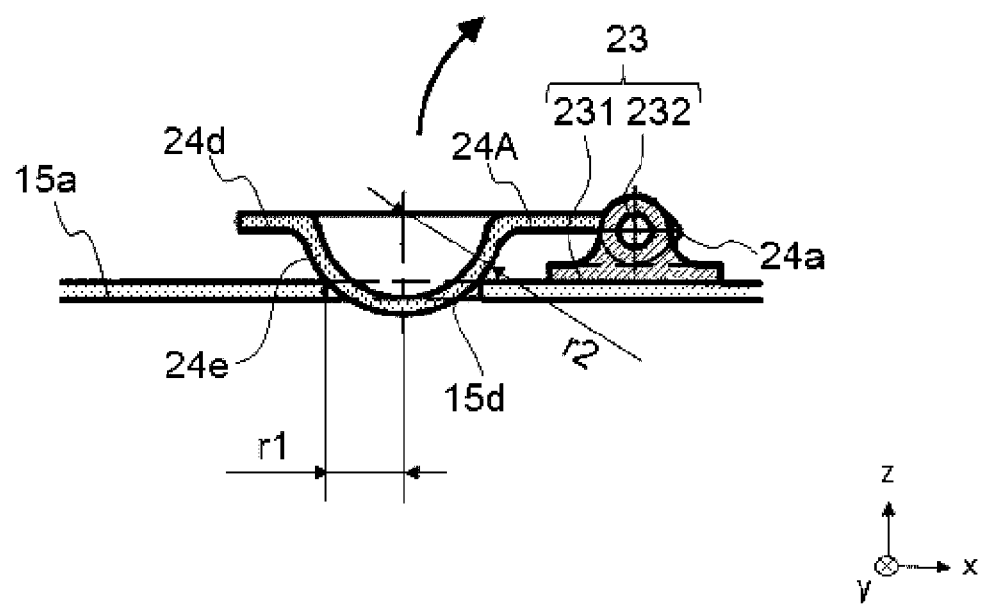
FIG. 8 is a cross-sectional view illustrating an outline of an air vent portion 20B according to a modified example.
Figure 9:
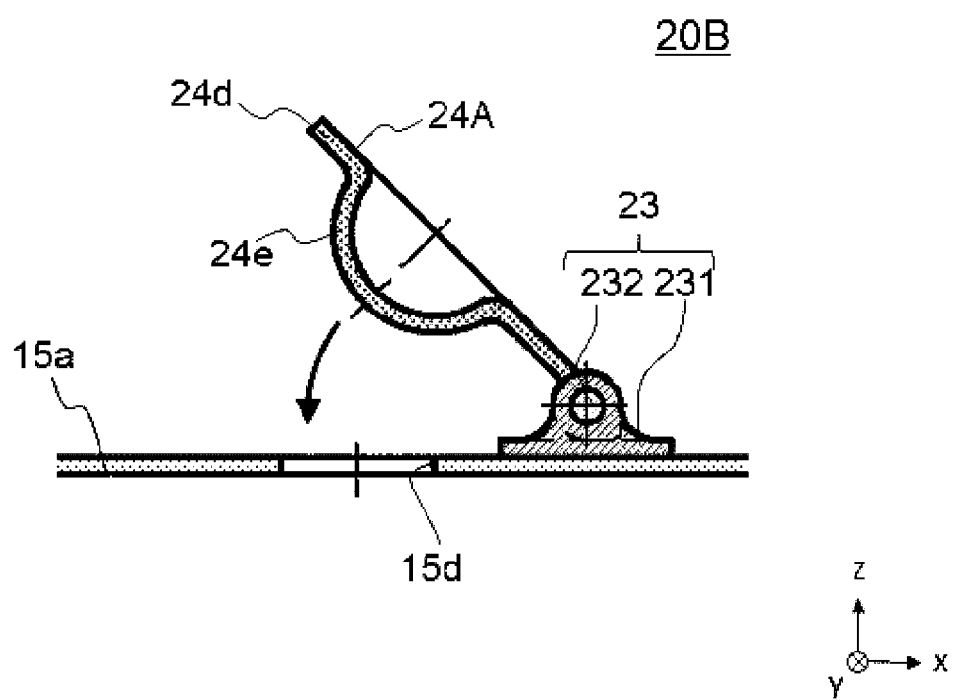
FIG. 9 is a cross-sectional view illustrating an outline of the air vent portion 20B according to the modified example.

Note that in the present embodiment, the plate-shaped moving member 24 is rotated about the rotation shaft 232, but the configuration of the moving member is not limited to this. FIG. 8 and FIG. 9 are cross-sectional views illustrating an outline of an air vent portion 20B according to a modified example. The air vent portion 20B primarily includes the hinge 23 and a moving member 24A. FIG. 8 illustrates a case in which the moving member 24A is disposed at a position of covering the air vent hole 15d, and FIG. 9 illustrates a case in which the moving member 24A is disposed at a position of opening the air vent hole.

The moving member 24A includes a plate-shaped portion 24d having a substantially plate shape, and the end portion 24a of the plate-shaped portion 24d is provided on the rotation shaft 232. As a result, the moving member 24A is rotatable about the rotation shaft 232.

In addition, the plate-shaped portion 24d has a spherical portion 24e protruding downward from the plate-shaped portion 24d. The spherical portion 24e is formed in a substantially hemispherical shape having a radius r2 greater than a radius r1 of the air vent hole 15d. A distal end (a lower end) of the spherical portion 24e is inserted into the air vent hole 15d, so that the moving member 24A closes the air vent hole 15d. Since the spherical portion 24e and the air vent hole 15d are in contact by a line, close contact between the surface 24c and the surface 15a is prevented.

When the moving member 24A is pushed up by compressive force of the air accumulated on the lower side of the plate 15, the moving member 24A rotates about the rotation shaft 232 (see the arrow in FIG. 8), and moves from the position where the air vent hole 15d is closed as illustrated in FIG. 8 to the position where the air vent hole 15d is opened as illustrated in FIG. 9. As a result, the air vent hole 15d is opened, and the air accumulated on the lower side of the plate 15 is released to the outside of the strainer portion 10.

When the hydraulic oil stored in the tank body 101 is suctioned into the hydraulic pump (not illustrated), the suctioning force by the hydraulic pump (not illustrated) causes the moving member 24A to rotate about the rotation shaft 232 in the direction of closing the air vent hole 15d (see the arrow in FIG. 9), and the moving member 24A covers the air vent hole 15d. As a result, the hydraulic oil from which the air bubbles have not been removed no longer flows into the inner tube 12.

Third Embodiment

While the moving member 22 is moved in the vertical direction along the rod-shaped member 21 to open and close the air vent holes 15b in the first embodiment of the present invention, the configuration for opening and closing the air vent hole is not limited thereto.

The third embodiment of the present invention is a configuration in which a moving member provided on the plate is moved to open and close an air vent hole. A suction strainer 3 according to the third embodiment will be described below. Note that the same components as those in the first embodiment are denoted by the same reference numerals, and descriptions thereof will be omitted.

Figure 10:
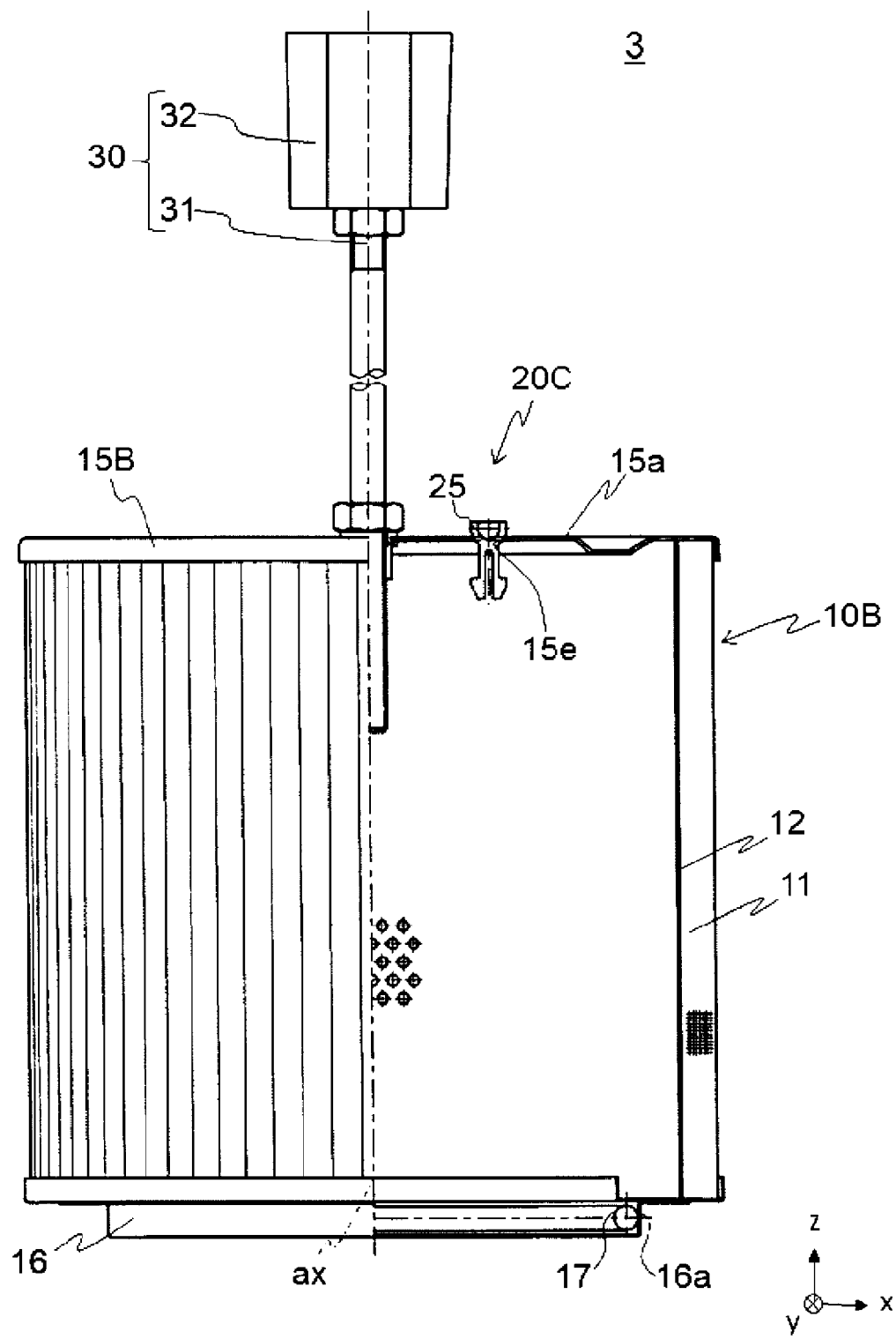
FIG. 10 is a diagram illustrating an outline of a suction strainer 3.

FIG. 10 is a diagram illustrating an outline of a suction strainer 3 (note that hatching indicating a cross section is omitted). The suction strainer 3 primarily includes a strainer portion 10B, an air vent portion 20C, and the rod portion 30 connected to the strainer portion 10B.

The strainer portion 10B primarily includes the filtration section 11, the inner tube 12, and a plate 15B and the plate 16. The air vent portion 20C includes a moving member 25. The plate 15B has the surface 15a, and an air vent hole 15e is formed in the surface 15a. The air vent hole 15e is provided in the vicinity of the rod 31 in plan view (as viewed in the z-direction), but the position of the air vent hole 15e is not limited to this.

Figure 11:
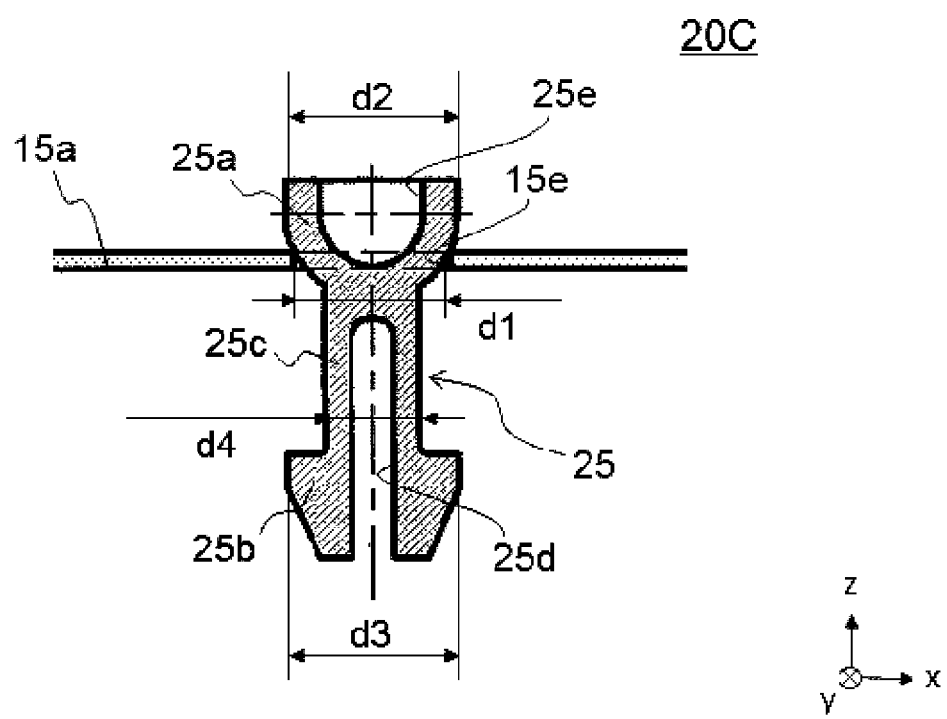
FIG. 11 is a cross-sectional view illustrating an outline of an air vent portion 20C.
Figure 12:
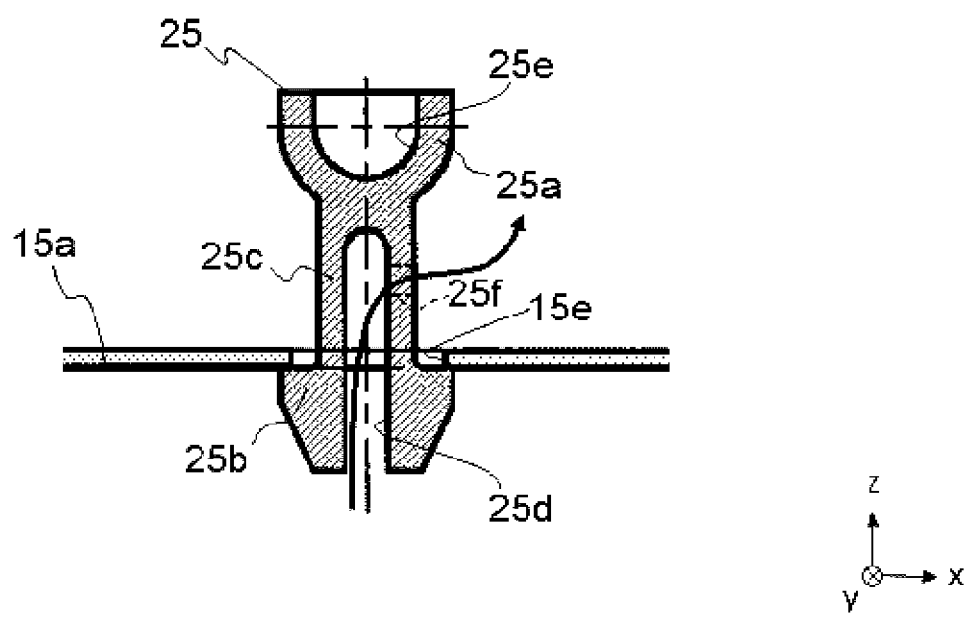
FIG. 12 is a cross-sectional view illustrating an outline of the air vent portion 20C.

FIG. 11 and FIG. 12 are cross-sectional views illustrating an outline of the air vent portion 20C. FIG. 11 illustrates a case in which the moving member 25 is disposed at a position of covering the air vent hole 15e, and FIG. 12 illustrates a case in which the moving member 25 is disposed at a position of opening the air vent hole 15e.

The moving member 25 is formed using a material (may be metal or resin) having a density greater than or substantially equal to a density of the hydraulic oil. The moving member 25 has a rod shape as a whole and includes a first stopper 25a provided at the upper end portion, a second stopper 25b provided at the lower end portion, and a rod-shaped member 25c that connects the first stopper 25a and the second stopper 25b.

The first stopper 25a has a substantially hemispherical shaped (the lower half of a substantially hemispherical shape) portion protruding downward. Since the first stopper 25a and the air vent hole 15e are in contact by a line, close contact between the first stopper 25a and the surface 15a is prevented. Note that the shape of the first stopper 25a is not limited thereto, and the first stopper 25a may have a substantially spherical shape, for example.

In plan view, a diameter d4 of the rod-shaped member 25c is smaller than a diameter d1 of the air vent hole 15e. In addition, in plan view, a diameter d2 of the first stopper 25a and a diameter d3 of the second stopper 25b are larger than the diameter d1 of the air vent hole 15e. Accordingly, the moving member 25 moves in the air vent hole 15e in the vertical direction (the z-direction). The first stopper 25a and the second stopper 25b avoid the moving member 25 to come off from the air vent hole 15e.

The second stopper 25b and the rod-shaped member 25c have a slit 25d along the longitudinal direction. Thus, the second stopper 25b and the rod-shaped member 25c are deformable in the direction in which the diameter is narrowed, and the moving member 25 is provided on the surface 15a by pushing the moving member 25 from the above (the +z side) into the air vent hole 15e.

Next, the action of the suction strainer 3 will be described. Among the actions of the suction strainer 3, the same portions as the actions of the suction strainer 1 will not be described below.

The air accumulated on the lower side of the plate 15 pushes up the moving member 25 (the +z direction). As a result, the moving member 25 moves from the position where the air vent hole 15e is covered as illustrated in FIG. 11 to the position where the air vent hole 15e is opened as illustrated in FIG. 12. A hole 25f along the radial direction is provided in the rod-shaped member 25c, and the air accumulated on the lower side of the plate 15 is released to the outside of the strainer portion 10 via the air vent hole 15e, the slit 25d, and the hole 25f (see the arrow in FIG. 12).

When the hydraulic oil stored in the tank body 101 is suctioned into the hydraulic pump (not illustrated), the suctioning force by the hydraulic pump (not illustrated) causes the moving member 25 to move downward (the −z direction), and the moving member 25 (the first stopper 25a) covers the air vent hole 15e. As a result, the hydraulic oil from which the air bubbles have not been removed no longer flows into the inner tube 12.

According to the present embodiment, the air accumulated inside the strainer portion 10, that is, on the lower side of the plate 15, can be released from the inside of the strainer portion 10 to outside the tank body 101. In addition, the air vent portion 20C is constituted only by the moving member 25, thus ensuring configuring the air vent structure having the compact and simple configuration.

Figure 13:
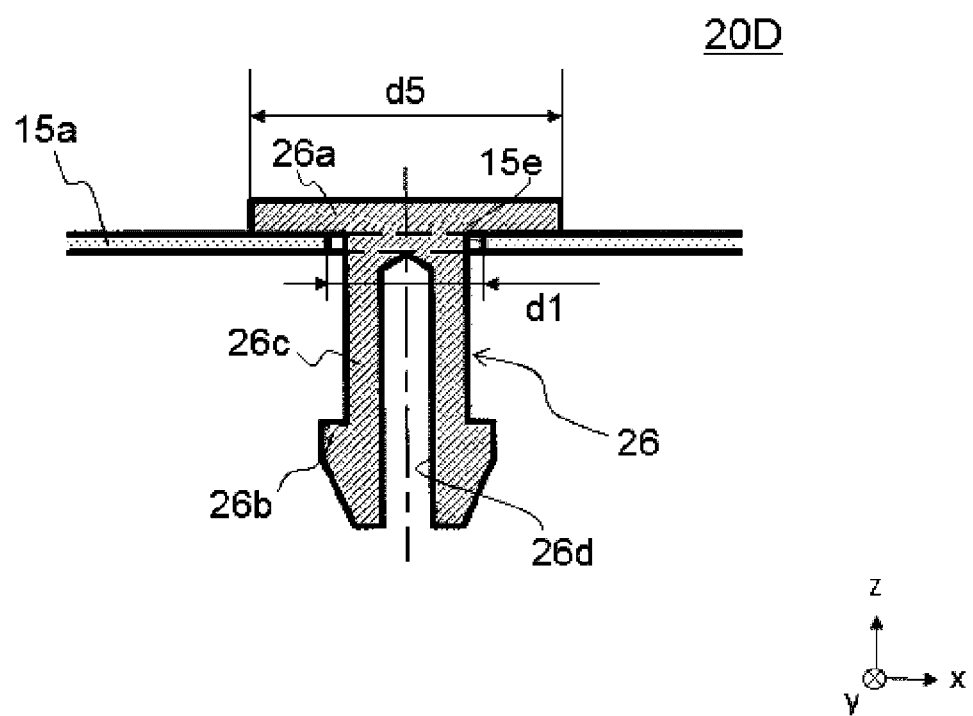
FIG. 13 is a cross-sectional view illustrating an outline of an air vent portion 20D according to a modified example.
Figure 14:
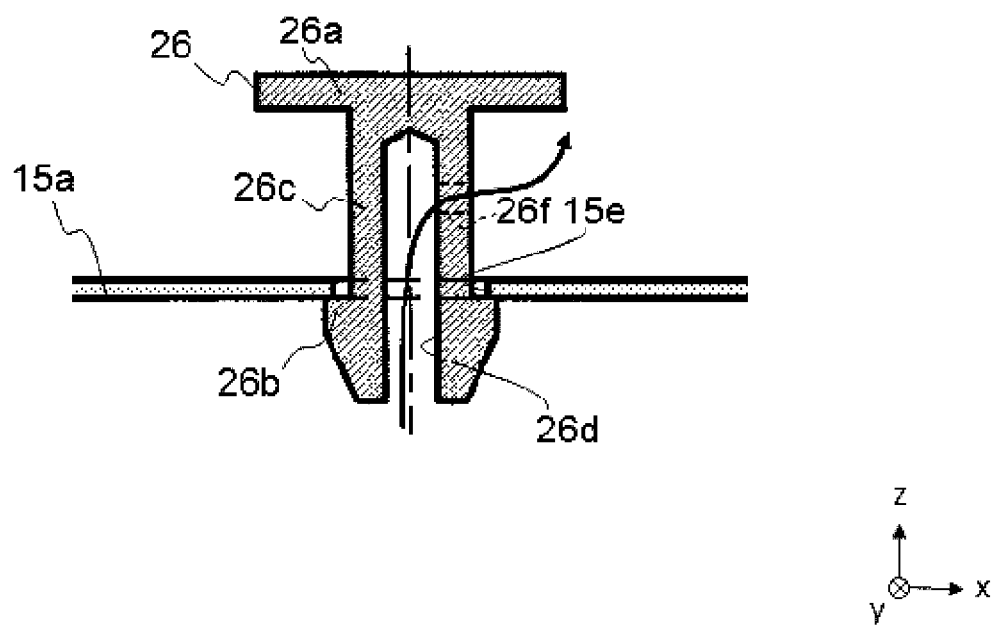
FIG. 14 is a cross-sectional view illustrating an outline of the air vent portion 20D according to the modified example.

Note that the moving member 25 is used in the present embodiment, but the shape of the moving member is not limited to this. FIG. 13 and FIG. 14 are cross-sectional views illustrating an outline of an air vent portion 20D according to a modified example. The air vent portion 20D includes a moving member 26. FIG. 13 illustrates a case in which the moving member 26 is disposed at a position of covering the air vent hole 15e, and FIG. 14 illustrates a case in which the moving member 26 is disposed at a position of opening the air vent hole 15e.

The moving member 26 has a rod shape as a whole and includes a first stopper 26a provided at the upper end portion, a second stopper 26b provided at the lower end portion, and a rod-shaped member 26c that connects the first stopper 26a and the second stopper 26b. To push the moving member 26 from the above (the +z side) into the air vent hole 15e, the second stopper 26b and the rod-shaped member 26c have a slit 26d along the longitudinal direction. The second stopper 26b, the rod-shaped member 26c, and the slit 26d are similarly to the second stopper 25b, the rod-shaped member 25c, and the slit 25d, and thus descriptions thereof will be omitted.

The first stopper 26a has a substantially plate shape, and a diameter d5 of the first stopper 26a is greater than the diameter d1 of the air vent hole 15e. Accordingly, the moving member 26 moves in the air vent hole 15e in the vertical direction (the z-direction). The first stopper 26a and the second stopper 26b avoid the moving member 26 to come off from the air vent hole 15e.

When the moving member 26 is pushed up by the air accumulated on the lower side of the plate 15 via the air vent hole 15e, the moving member 26 moves from the position where the air vent hole 15e is closed as illustrated in FIG. 13 to the position where the air vent hole 15e is opened as illustrated in FIG. 14. A hole 26f along the radial direction is provided in the rod-shaped member 26c, and the air accumulated on the lower side of the plate 15 is released to the outside of the strainer portion 10 via the air vent hole 15e, the slit 26d, and the hole 26f (see the arrow in FIG. 14).

When the hydraulic oil stored in the tank body 101 is suctioned into the hydraulic pump (not illustrated), the suctioning force by the hydraulic pump (not illustrated) causes the moving member 26 to move downward, and the moving member 26 covers the air vent hole 15e. As a result, the hydraulic oil from which the air bubbles have not been removed no longer flows into the inner tube 12.

Note that a projection may be provided on the surface on the lower side (the −z side) of the first stopper 26a. This projection, similarly to the projection 24b, has a substantially circular ring shape in plan view and has a cross-sectional shape of a substantially triangular shape or a substantially semicircular shape. This allows avoiding close contact between the first stopper 26a and the surface 15a.

Figure 15:
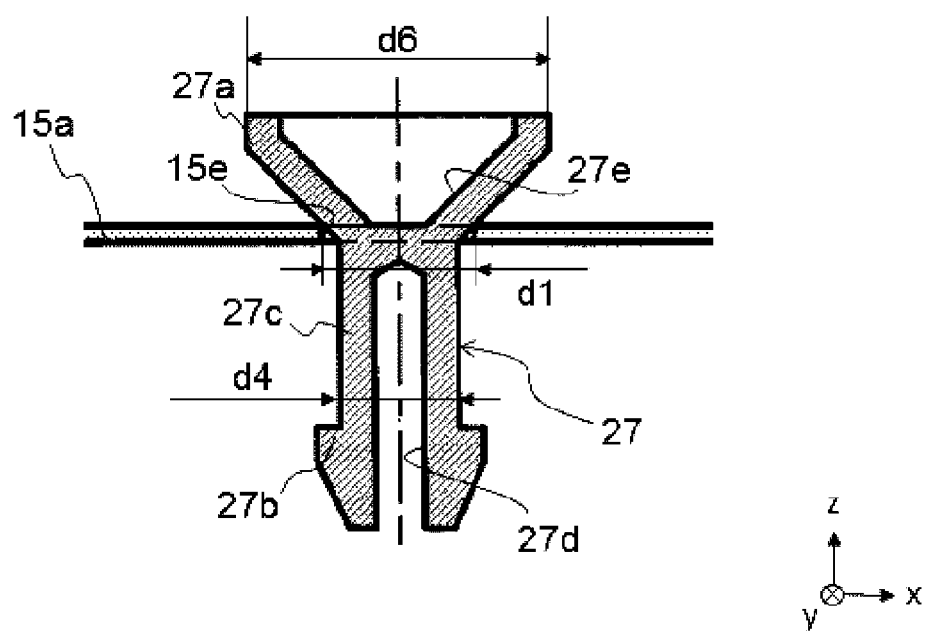
FIG. 15 is a cross-sectional view illustrating an outline of an air vent portion 20E according to a modified example.
Figure 16:
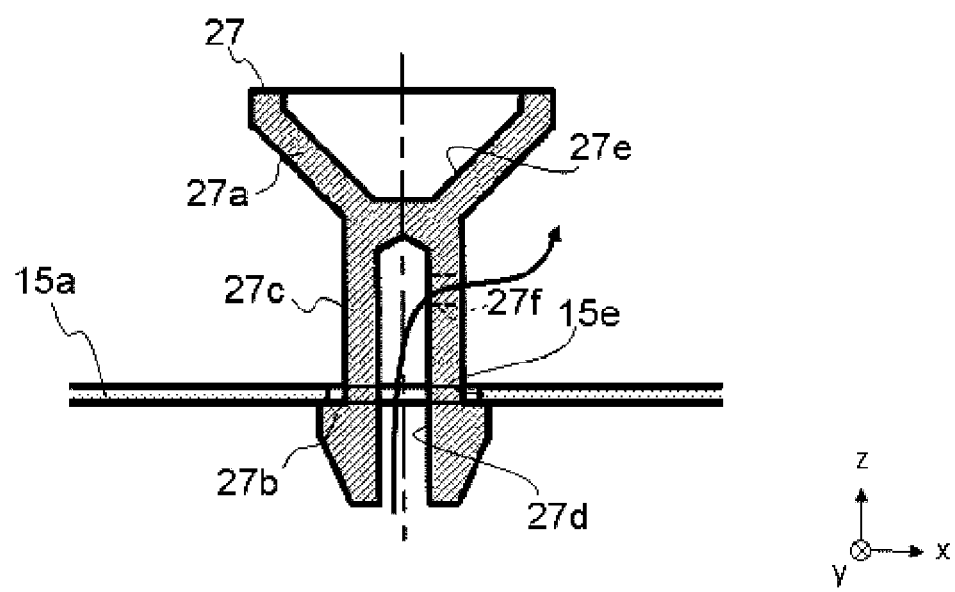
FIG. 16 is a cross-sectional view illustrating an outline of the air vent portion 20E according to the modified example.

FIG. 15 and FIG. 16 are cross-sectional views illustrating an outline of an air vent portion 20E according to another modified example. The air vent portion 20E includes a moving member 27. FIG. 15 illustrates a case in which the moving member 27 is disposed at the position of covering the air vent hole 15e, and FIG. 16 illustrates a case in which the moving member 27 is disposed at a position of opening the air vent hole 15e.

The moving member 27 has a rod shape as a whole and includes a first stopper 27a provided at the upper end portion, a second stopper 27b provided at the lower end portion, and a rod-shaped member 27c that connects the first stopper 27a and the second stopper 27b. To push the moving member 27 from the above (the +z side) into the air vent hole 15e, the second stopper 27b and the rod-shaped member 27c have a slit 27d along the longitudinal direction. The second stopper 27b, the rod-shaped member 27c, and the slit 27d are similarly to the second stopper 25b, the rod-shaped member 25c, and the slit 25d, and thus descriptions thereof will be omitted.

The first stopper 27a has a substantially truncated cone shape with a bottom surface (a large circle) facing the upper side (the +z side), and the upper surface (a small surface) facing the lower side (the −z side). A diameter of the bottom surface d6 is greater than the diameter d1 of the air vent hole 15e. The upper surface of the first stopper 27a is connected to the rod-shaped member 27c, and the diameter d4 of the first stopper 27a is smaller than the diameter d1 of the air vent hole 15e. Accordingly, the moving member 27 moves in the air vent hole 15e in the vertical direction (the z-direction). The first stopper 27a and the second stopper 27b avoid the moving member 27 to come off from the air vent hole 15e.

When the moving member 27 is pushed up by the air accumulated on the lower side of the plate 15, the moving member 27 moves from the position where the air vent hole 15e is closed as illustrated in FIG. 15 to the position where the air vent hole 15e is opened as illustrated in FIG. 16. A hole 27f along the radial direction is provided in the rod-shaped member 27c, and the air accumulated on the lower side of the plate 15 is released to the outside of the strainer portion 10 via the air vent hole 15e, the slit 27d, and the hole 27f (see the arrow in FIG. 16).

When the hydraulic oil stored in the tank body 101 is suctioned into the hydraulic pump (not illustrated), the suctioning force by the hydraulic pump (not illustrated) causes the moving member 27 to move downward, and the moving member 27 (the first stopper 27a) covers the air vent hole 15e. As a result, the hydraulic oil from which the air bubbles have not been removed no longer flows into the inner tube 12.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

Additionally, in the present invention, "substantially" is a concept not only including the case of being strictly the same, but also including an error and deformation to the extent that a loss of identity does not occur. For example, the term "substantially orthogonal" is not limited to the case of being strictly orthogonal, but includes a concept that includes deviations of several degrees, for example. Further, simple expressions such as orthogonal, parallel, identical, and a tubular shape are not to be understood as merely being strictly, for example, orthogonal, parallel, identical, and a tubular shape, and include being, for example, substantially parallel, substantially orthogonal, substantially identical, and a substantially tubular shape.

Additionally, in the present invention, "vicinity" means to include a region in a certain range (the range can be determined arbitrarily) near a reference position. For example, the term "a vicinity of an end" refers to a range of regions in the vicinity of the end, and is a concept indicating that the end may or need not be included.

REFERENCE SIGNS LIST 1, 2, 3: Suction strainer
10, 10A, 10B: Strainer body
11: Filtration section
12: Inner tube
15, 15A, 15B: Plate
15a: Surface
15b, 15d, 15e: Air vent hole
15c: Hole
16: Plate
16a: Fitting portion
17: Sealing member 20, 20A, 20B, 20C, 20D, 20E: Air vent portion
21: Rod-shaped member
22: Moving member
22a: Hole
22b: Surface
22c, 22d: Projection
22e: Outer peripheral surface
23: Hinge
24, 24A: Moving member
24a: End portion
24b: Projection
24c: Hole
24d: Plate-shaped portion
24e: Spherical portion
25, 26, 27: Moving member
25a, 26a, 27a: First stopper
25b, 26b, 27b: Second stopper
25c, 26c, 27c: Rod-shaped member
25d, 26d, 27d: Slit
25f, 26f, 27f: Hole
30: Rod portion
31: Rod
32: Mounting portion
100: Hydraulic oil tank
101: Tank body
101a: Inflow port
101b: Opening
101c: Opening
101d: Outflow port
101e: Partition plate
102, 103: Lid body
104: Suction pipe
105: Bolt
110: Return filter
211: Body portion
212 Rod-shaped portion
213, 214: Stopper
215: Guide portion
231: Base portion
232: Rotation shaft

The invention claimed is:

1. A suction strainer provided inside a tank in which oil is stored, the suction strainer comprising:
   a tubular filtration section comprising a thin plate bended into a pleat shape;
   a lower plate and an upper plate, wherein the upper plate covers an entire upper end surface of the filtration section, the upper plate having an air vent hole;
   a moving member having a plate shape, the moving member being provided to be movable between a position of closing the air vent hole and a position of opening the air vent hole;
   the upper plate includes a rod-shaped portion provided with a stopper on an upper end portion;
   the air vent hole is provided around the rod-shaped member in plan view;
   the moving member having a hole into which the rod-shaped member is inserted;
   the moving member is movable along directions perpendicular to the plate shape between a lower end position, while maintaining a posture of the plate shape parallel to the upper plate and the lower plate, where the moving member is adjacent to the upper plate to close the air vent hole and an upper end position where the moving member abuts on the stopper;
   a first projection and a second projection having circular ring shapes in plan view are disposed on a lower surface of the moving member; and
   the first projection tapered toward its destal end is disposed in a vicinity of an inner peripheral surface of the moving member, and the second projection tapered toward its destal end is disposed in a vicinity of an outer peripheral surface of the moving member.

2. A suction strainer provided inside a tank in which oil is stored, the suction strainer comprising:
   a tubular filtration section comprising a thin plate bended into a pleat shape;
   an upper plate that covers an entire upper end surface of the filtration section, the upper plate having an air vent hole; and
   a moving member provided to be movable between a position of closing the air vent hole and a position of opening the air vent hole
   wherein
   the moving member includes a first stopper provided at an upper end portion, a second stopper provided at a lower end portion, and a rod-shaped member that connects the first stopper and the second stopper;
   the first stopper and the second stopper have diameters greater than a diameter of the air vent hole in plan view;
   the rod-shaped member has a diameter smaller than the diameter of the air vent hole in plan view;
   the first stopper has a hemispherical shape or a truncated cone shape;
   the first stopper and the air vent hole are in contact by a line; and
   a slit extends along a longitudinal direction of the rod-shaped member, through the second stopper and the rod-shaped member, the slit having an opening at an end of the second stopper in a cross section along the longitudinal direction.

\* \* \* \* \*